Figure 1:
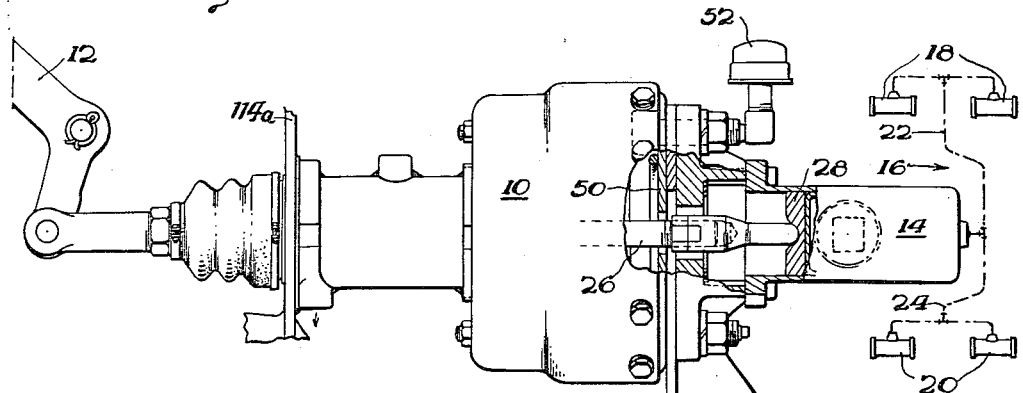

Sept. 4, 1956     J. F. SHUMAKER     2,761,427

FLUID PRESSURE ACTUATOR

Filed Sept. 20, 1951

INVENTOR
John F. Shumaker.

BY Scrivener & Parker

ATTORNEYS

United States Patent Office 2,761,427
Patented Sept. 4, 1956

2,761,427

FLUID PRESSURE ACTUATOR

John F. Shumaker, Elyria, Ohio, assignor to Bendix-Westinghouse Automotive Air Brake Company, Elyria, Ohio, a corporation of Delaware Application September 20, 1951, Serial No. 247,503

6 Claims. (Cl. 121—41)

This invention relates to vehicle braking systems and more particularly to a combined compressed air hydraulic system which is particularly adapted for securing increased braking pressures on vehicles equipped with brakes of the conventional hydraulically actuated type.

In certain types of vehicles which include hydraulic braking systems, it has been found desirable to increase the braking pressures which are normally obtainable, by the use of power boosters which may be of the vacuum or compressed air type. Such combined constructions have met with much success and are quite popular for use on light trucks and busses where braking pressures higher than those obtainable by the usual manual operation of the master cylinder of the conventional hydraulic system, are desirable. The prior combined systems, while efficient in operation, are nevertheless complicated in construction, due to the fact that the power booster is generally controlled by the master cylinder and in these devices it is necessary to install the booster in the hydraulic braking line. Such installations are costly and require special types of valves for securing the required control of the booster with the desired follow-up action and the reactive feel of the degree of brake application.

It is accordingly one of the objects of the present invention to provide a combined compressed air and hydraulic braking system which is so constituted as to be unusually simple in construction and which will avoid the complications and the disadvantages of the prior systems.

A further object of the invention is to provide a system of the foregoing character which avoids the necessity of inserting the power booster in the hydraulic line, thus dispensing with the necessity of utilizing control valves for the booster which are governed in their operation by variations in hydraulic pressure.

Another object resides in a novel arrangement wherein the booster is placed in series between the brake pedal and the hydraulic master cylinder, such an arrangement enabling the booster to be directly mechanically operated, through manual manipulation of the brake pedal, and also enabling the unit to be quickly installed in combination with existing hydraulic braking systems without cutting into or otherwise disturbing the hydraulic lines.

Still another object is to provide a novel compressed air operated servo or booster actuator which, while especially adapted for use in connection with hydraulic braking systems, is nevertheless useful for a wide variety of applications where readily controllable action of the compressed air and resulting travel of the actuated element of the booster are desired.

A still further object resides in a novel combination of elements which offer the advantages of simplified construction, installation and repair, combined with ease of control which is effected by the use of follow-up valve action accompanied by reactive feel, the arrangement being decidedly valuable in connection with vehicles equipped with hydraulic braking systems where additional braking power is required.

The above and other objects of the invention will appear more fully hereinafter from a consideration of the following detailed description when taken in connection with the accompanying drawing which is illustrative of one form of the invention. It is to be expressly understood however, that the drawing is utilized for purposes of illustration only and is not to be taken as a definition of the limits of the invention, reference being had for this purpose to the appended claims.

Figure 2:
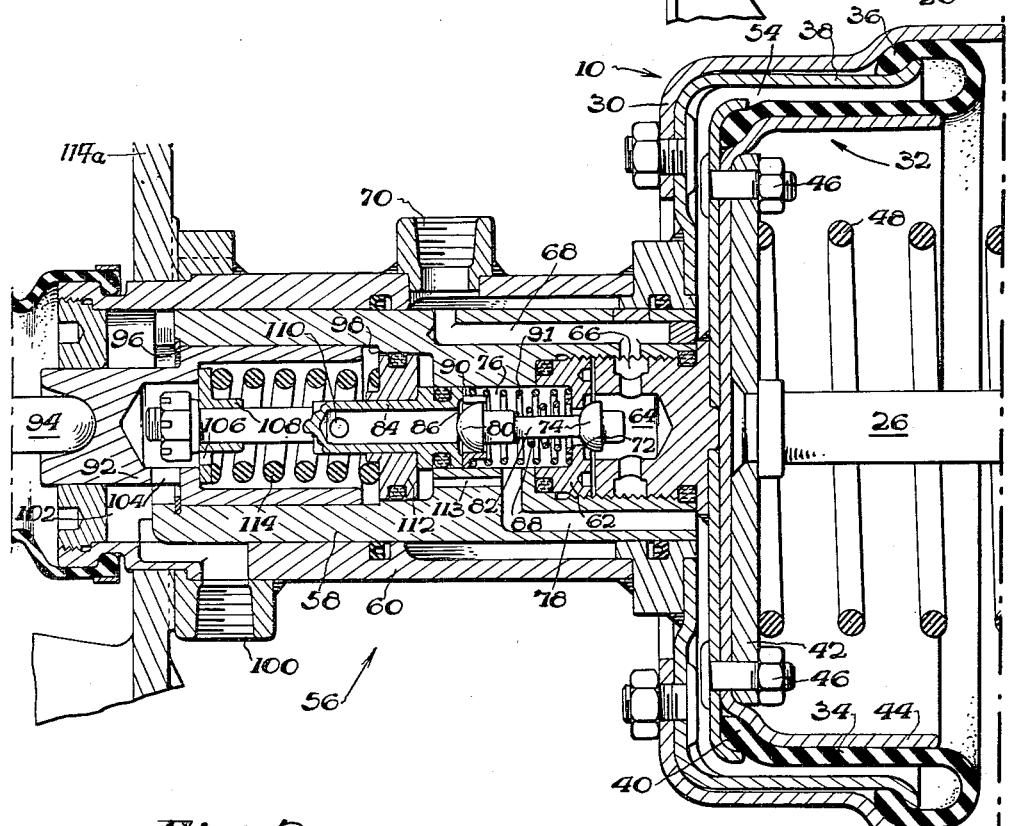

Referring to the drawing, wherein similar reference characters refer to similar parts throughout the several views:

Fig. 1 is a side view, partly in section, of a combined compressed air controlled hydraulic braking system constructed in accordance with the principles of the present invention, and Fig. 2 is an axial sectional view of the major portion of the compressed air operated servomotor or actuator.

Referring more particularly to Fig. 1, the present invention includes a compressed air operated servomotor or actuator 10 which is placed in series between a brake pedal 12 and a master cylinder 14 of a vehicle hydraulic braking system 16, the latter including a plurality of wheel cylinders 18 and 20 which are connected by hydraulic lines 22 and 24 with the master cylinder 14 in the conventional manner. As shown, the motor 10 is provided with a piston rod 26 which abuts the master piston 28 of the master cylinder 14, the construction of the motor 10 being such that the operation of the piston rod 26 and hence the master cylinder 14 may be precisely controlled in the same manner as if the pedal 12 were directly connected to the master piston 28, except for the fact that in the present invention, the movement of such master piston is effected by the power of the compressed air or by combined manual effort and power. As will appear more fully hereinafter, the construction of the invention is also such that in the event of failure of the source of compressed air, the hydraulic braking system may be manually controlled in the same manner as if the motor 10 were not present.

As will readily appear from Fig. 2, the novel servomotor or actuator 10 comprises a cylinder 30 having a pressure responsive member 32 therein, the latter including a flexible diaphragm in the form of a stockinette 34 which is clamped at one beaded edge 36 to the cylinder by a sleeve 38, and which is also clamped at its other beaded edge 40 to a follower plate 42 by a second sleeve 44. The latter sleeve and follower plate 42 are secured together by a plurality of bolts 46 while the plate 42 is secured to the piston rod 26 and is normally maintained in the retracted position shown, as by means of a spring 48 which is interposed between the plate 42 and an end plate 50. The latter is provided with a filtered air inlet 52 in order to allow free communication between the atmosphere and the space to the right of the follower plate 42. The space to the left of the follower plate 42 and bounded by the flexible stockinette 34 constitutes a pressure space 54 to which compressed air is supplied and exhausted by means of the valve construction described hereinafter, the supply of compressed air to the space 54 effecting movement of the pressure responsive member 32 to the right in order to apply the brakes through the piston rod 26 and the above described components of the hydraulic braking system.

In order to control the application of compressed air to and from the pressure space 54, the servomotor 10 includes a novel valve mechanism 56 which is so constructed and arranged as to have a follow-up action and to also provide a reactive "feel" for the operator in order that a nicely graduated application and release of the brakes may be effected. More particularly, such valve mechanism 56 includes a movable sleeve 58 which is secured at its right end to the pressure responsive member 32, as by welding for example, and is slidably mounted in a stationary sleeve 60 which is secured to and extends outwardly of the cylinder 30. At its inner end, the sleeve 58 is provided with a valve cage 62 having an inlet chamber 64 which is in constant communication with a source of compressed air by way of port 66, duct 68 and connection 70. The valve cage 62 is also formed with an inlet valve seat 72 against which an inlet valve 74 is adapted to be seated, and in the normal position illustrated, with no compressed air in the system, the inlet valve 74 is closed and is effective to interrupt communication between the inlet chamber 64 and an outlet chamber 76 which communicates at all times with the pressure space 54 by way of duct 78. As shown, an exhaust valve 80 is rigidly connected through a stem 82 with the inlet valve 74, and in the normal position illustrated, connects the outlet chamber 76 with the atmosphere by way of a hollow valve operating member 84 which is formed at its right end with an exhaust valve seat 86. It will be understood that a valve return spring 88 normally tends to close the inlet valve 74 at all times and that the exhaust valve 80 is adapted to slide within a cylindrical, slotted guide 90, the latter and the valve operating member 84 being normally biased to the position illustrated by means of a spring 91. Thus in the normal position, with no compressed air in the system, the pressure space 54 is vented to the atmosphere through duct 78, outlet chamber 76, the open exhaust valve 80 and the hollow valve operating member 84.

A novel construction is provided for controlling the operation of the interconnected exhaust and intake valves 80 and 74, and in the form shown, includes a valve controlling plunger 92 which is operatively connected through a link 94 with the pedal 12 and is slidably mounted within the movable sleeve 58, such sliding movement being limited by the two interiorly disposed abutments 96 and 98 on the said sleeve 58. As shown, the plunger 92 is hollow and is adapted to connect an atmospheric port 100 with the hollow valve operating member 84 by way of space 102, port 104, slot 106 in guide 108 and opening 110 in member 84, so that the pressure space 54 may be connected to the atmosphere whenever the exhaust valve 80 is open. A pressure reactive piston 112, which is always subjected on its right face to the pressure existing within the pressure space 54, through connection 113, surrounds the valve operating member 84 and a graduating spring 114 is confined between the piston 112 and the guide 108, the latter bearing at all times directly against the valve operating plunger 92 due to the action of the spring 114.

With the above construction, it will be readily apparent that the present invention may be readily mounted on a suitable bracket 114a adjacent the brake pedal 12 and readily associated with the master cylinder 14 of the conventional hydraulic brake system with which the vehicle is equipped. In making such an installation upon a vehicle equipped with conventional hydraulic brakes, it is only necessary to separate the pedal 12 from the master cylinder 14 and insert the servomotor 10 in the manner illustrated in Fig. 1. Such an installation may be quickly effected and the resultant system will derive the advantage of compressed air power operation, while retaining all of the operative components of the hydraulic system with which the vehicle is equipped.

In operation, the parts are illustrated in the non-power position where the brakes are retracted by the usual return springs associated with the wheel cylinders and the pressure responsive member 32 is retracted by the return spring 48. Under these conditions, the pressure space is vented to atmosphere by way of the connections 78, 76, open exhaust valve 80, 110, 106, 104, 102 and 100. When it is desired to apply the brakes, the operator moves the pedal 12 in the usual manner to effect movement of the plunger 92 to the right to compress the graduating spring 114 and to move the piston 112 and the valve operating member 84 against the action of the spring 91. As soon as the exhaust valve seat 86 contacts the exhaust valve 80, communication between the pressure space 54 and the atmosphere will be interrupted, it being understood that further movement of the pedal 12 and parts 112 and 84 will open the inlet valve 74 and allow compressed air to flow to the pressure space 54 by way of connections 70, 68, 66, 64, open inlet valve 74, outlet chamber 76 and duct 78. Assuming that the pedal 12 remains stationary after a relatively slight pressure is admitted to the pressure space 54, the present invention allows the pressure responsive member 32 to be moved a predetermined distance to apply the brakes a corresponding amount through operation of the master cylinder 14. This action will be clear from the follow-up operation of the valve mechanism 56. For example, as the member 32 moves to the right, the sleeve 58 moves with it and finally closes the inlet valve 74 when the inlet valve seat 72 contacts the inlet valve. With both the exhaust and inlet valves 80 and 74 closed, further flow of compressed air to the pressure space 54 will be shut off and the brakes will remain in the partially applied position determined of course by the pressure existing in the space 54.

It will also be noted that due to the reactive piston 112 which is always subjected to the pressure within the pressure space 54, by way of the connection 113, the operator will always feel the degree of application of the brakes. In other words, compression of the graduating spring 114 to apply the brakes will always be opposed by the resultant air pressure which acts on the area of the piston 112 to oppose further compression of the graduating spring 114. Thus the force with which the operator pushes on the pedal 12 will always be opposed by a force which is proportional to the degree of braking. Due to this construction, the application of the brakes may be controlled within close limits and with the accompanying reaction or "feel" to which the operator is accustomed.

From the foregoing, it will be understood that a further movement of the pedal 12 will result in again opening the inlet valve 74 to admit additional pressure to the pressure space 54. Here again, movement of the member 32 will carry the sleeve 58 with it to again lap the valves in the new position of braking. The increased pressure will also be admitted to the space at the right of the reactive piston 112 so that the reaction to the operator's foot will be correspondingly increased. Release of the brakes is effected by release of pressure on the pedal 12, whereupon the parts reassume their positions, as illustrated, through opening of the exhaust valve 80 and the action of the springs 48, 88, 91, and 114.

From the above, it will be readily seen that, if desired, combined manual and power operation of the pressure responsive member 32 may be effected. Thus, should the pedal 12 be moved a sufficient distance to correspondingly move the plunger 92 into contact with the abutment 98, the sleeve 58 and connected pressure responsive member 32 may be manually operated concurrently with power operation. This construction also enables the member 32 to be operated manually in the event of failure or disconnection of the supply of compressed air. Thus, the plunger 92 is mounted for limited movement with respect to the sleeve 58, such movement being defined by the positioning of the abutments 96 and 98.

There has thus been provided by the present invention, a novel and materially simplified air-hydraulic vehicle braking system, which may be quickly installed for use upon vehicles which are equipped with hydraulic systems. The installation of the invention may be effected without cutting into the hydraulic lines, it only being necessary to separate the existing pedal and master cylinder and to mount the present invention between these parts and in series therewith. The novel valving construction is highly effective in its operation and not only achieves the desired follow-up action for graduation of the braking application but also enables the highly desired reaction or "feel" to be obtained.

While one embodiment of the invention has been shown herein and described with considerable particularity, it will be understood by those skilled in the art that the invention is not limited to the form shown but may be embodied in a variety of expressions. Reference will therefore be had to the appended claims for a definition of the limits of the invention.

What is claimed is:

1. A fluid pressure actuator comprising a housing having a pressure responsive member therein, said member defining with said housing, a pressure chamber, a stationary sleeve rigidly connected with the housing and extending outwardly thereof, and means for controlling the flow of compressed air to and from the pressure chamber and for manually moving said pressure responsive member, comprising a follow-up valve device including a movable sleeve connected with said member and mounted for sliding movement within the stationary sleeve, an inlet valve for connecting said pressure chamber with a source of compressed air, an exhaust valve rigidly connected with the inlet valve, resilient means for normally closing the inlet valve, a valve operating member having an exhaust valve seat formed at one end thereof, resilient means for normally maintaining said valve operating member in a position where the exhaust valve seat is spaced from the exhaust valve, a reactive pressure responsive element operatively connected with the valve operating member and mounted within the movable sleeve for sliding movement with respect thereto, means subjecting said reactive element at all times to the pressure within the pressure chamber, a manually operable plunger slidably mounted within the movable sleeve for limited sliding movement with respect thereto, a graduating spring interposed between said plunger and reactive element, and means for mechanically connecting the plunger and the movable sleeve to manually move the pressure responsive member after a predetermined amount of sliding movement of said plunger.

2. A fluid pressure actuator comprising a housing having a pressure responsive member therein, said member defining with said housing, a pressure chamber, a stationary sleeve rigidly connected with the housing and extending outwardly thereof, and means for controlling the flow of compressed air to and from the pressure chamber and for manually moving said pressure responsive member, comprising a follow-up valve device including a movable sleeve connected with said member and mounted for sliding movement within the stationary sleeve, said movable sleeve being formed with a partition having an inlet valve seat formed therein, said partition forming inlet and outlet chambers within the movable sleeve, an exhaust valve in the outlet chamber, an inlet valve in the inlet chamber, means rigidly interconnecting said valves, resilient means for normally closing the inlet valve against its seat to interrupt communication between the inlet and outlet chambers, means for connecting the outlet chamber at all times with the pressure chamber, a valve actuating member formed with an exhaust passage, a reactive pressure responsive element carried by the valve actuating member and subjected at all times to the pressure in the outlet chamber, and means for actuating said valve actuating member comprising a manually operable plunger slidably mounted within said movable sleeve, a graduating spring interposed between said plunger and the reactive element, and means for connecting said plunger and movable sleeve for movement together after a predetermined amount of sliding movement of the plunger has taken place, whereby manual movement of the pressure responsive member may take place.

3. A fluid pressure actuator comprising a housing having a pressure responsive member therein, said member defining with said housing, a pressure chamber, a stationary sleeve rigidly connected with the housing and extending outwardly thereof, and means for controlling the flow of compressed air to and from the pressure chamber and for manually moving said pressure responsive member, comprising a follow-up valve device including a movable sleeve connected with said member and mounted for sliding movement within the stationary sleeve, said movable sleeve being formed with a partition having an inlet valve seat, said partition forming inlet and outlet chambers within the movable sleeve, an exhaust valve in the outlet chamber, an inlet valve in the inlet chamber, means rigidly interconnecting said valves, a spring having one end bearing against said partition for normally moving said valves to a position where the inlet valve engages its seat to interrupt communication between the inlet and outlet chambers, a passage formed in the movable sleeve for connecting the outlet chamber at all times with the pressure chamber, a valve actuating member formed with an exhaust passage in constant communication with the atmosphere and having an exhaust valve seat at one end thereof, a spring having one end bearing against said partition for normally maintaining the valve actuating member in a position where the exhaust valve seat is spaced from the exhaust valve so that the outlet chamber and the pressure chamber are connected with the atmosphere, a reactive pressure responsive element carried by the valve actuating member and slidable within the movable sleeve, means for subjecting the reactive element at all times to the pressure in the outlet chamber, and means for actuating said valve actuating member comprising a manually operable plunger slidably mounted within said movable sleeve, a graduating spring interposed between said plunger and the reactive element, and means for connecting said plunger and movable sleeve for movement together after a predetermined amount of sliding movement of the plunger has taken place, whereby manual movement of the pressure responsive member may take place.

4. A fluid pressure actuator comprising a housing having a pressure responsive member therein, said member defining with said housing, a pressure chamber, a stationary sleeve rigidly connected with the housing and extending outwardly thereof, and means for controlling the flow of compressed air to and from the pressure chamber and for manually moving said pressure responsive member, comprising a follow-up valve device including a movable sleeve connected with said member and mounted for sliding movement within the stationary sleeve, said movable sleeve being formed with a partition having an inlet valve seat, said partition forming inlet and outlet chambers within the movable sleeve, an exhaust valve in the outlet chamber, an inlet valve in the inlet chamber, means rigidly interconnecting said valves, resilient means for normally closing the inlet valve against its seat to interrupt communication between the inlet and outlet chambers, means for connecting the outlet chamber at all times with the pressure chamber, a valve actuating member formed with an exhaust passage, a reactive pressure responsive element carried by the valve actuating member and subjected at all times to the pressure in the outlet chamber, and means for actuating said valve actuating member comprising a manually operable plunger slidably mounted within said movable sleeve, an abutment formed in the movable sleeve in the path of movement of said plunger, and a graduating spring interposed between said plunger and the reactive element and normally maintaining the plunger spaced from said abutment, manual movement of said plunger in opposite directions effecting operation of said valve operating member and valves through the graduating spring to graduate the compressed air to and from the pressure chamber with a follow-up action, and manual movement of the plunger an amount sufficient to compress the graduating spring and engage said abutment serving to manually move the pressure responsive member through the movable sleeve.

5. An air pressure operated actuator comprising a housing having a movable element therein defining with said housing, a pressure chamber, and means for controlling the movement of said element comprising a sleeve rigidly connected at its inner end with the element and extending outwardly of said housing, the outer portion of the sleeve being provided with a pair of spaced-apart abutments positioned interiorly thereof, a manually operable plunger slidably mounted within the outer end of the sleeve and positioned between said abutments, a valve mechanism comprising a pair of rigidly connected exhaust and inlet valves supported within said sleeve adjacent its inner end, a valve cage for the inlet valve carried by the sleeve adjacent its inner end, a valve operating member including an exhaust valve seat slidably mounted within the outer end of said sleeve between the exhaust valve and said plunger, and resilient means interposed between the valve operating member and the plunger and normally maintaining the latter in contact with one of said abutments and spaced from the other abutment, movements of said plunger with respect to said sleeve and between said abutments operating said valve operating member and said valve mechanism to control the flow of compressed air to and from the pressure chamber, and movement of said plunger to contact said other abutment enabling combined movement of the plunger and sleeve to manually move the movable element.

6. A fluid pressure actuator comprising a housing having a pressure responsive member therein, said member defining with said housing, a pressure chamber, a stationary sleeve rigidly connected with the housing and extending outwardly thereof, and means for controlling the flow of compressed air to and from the pressure chamber and for manually moving said pressure responsive member, comprising a follow-up valve device including a movable sleeve connected with said member and mounted for sliding movement within the stationary sleeve, said movable sleeve being provided with a pair of spaced-apart abutments, a valve cage carried by the movable sleeve and provided with an inlet chamber for connection with a source of compressed air, a normally closed inlet valve positioned within the inlet chamber for normally closing communication between the inlet chamber and the pressure chamber, means including a normally open exhaust valve for normally connecting the pressure chamber with the atmosphere, means for connecting the inlet and exhaust valves for movement together, a manually operable plunger slidably mounted within the movable sleeve between said abutments, said plunger having an exhaust valve seat formed at one end for closing the exhaust valve upon movement of the plunger in one direction, continued movement of said plunger in said one direction opening said inlet valve, and resilient means normally maintaining the plunger in engagement with one of said abutments and with said exhaust valve seat spaced from said exhaust valve and being yieldable so that upon failure of compressed air, the plunger will engage the other abutment and move the pressure responsive member through the movable sleeve.

References Cited in the file of this patent

UNITED STATES PATENTS

| | | |
|---|---|---|
| 1,817,800 | Bragg | Aug. 4, 1931 |
| 1,831,737 | Broussouse et al. | Nov. 10, 1931 |
| 1,846,089 | Davis | Feb. 23, 1932 |
| 1,921,590 | Staude | Aug. 8, 1933 |
| 2,007,423 | Davis | July 9, 1935 |
| 2,229,247 | Kamenarovic | Jan. 21, 1941 |
| 2,360,578 | Porter | Oct. 17, 1944 |
| 2,395,223 | Ingres | Feb. 19, 1946 |

FOREIGN PATENTS

| | | |
|---|---|---|
| 747,273 | France | Mar. 28, 1933 |